US006310450B1

(12) United States Patent
Arrigo

(10) Patent No.: US 6,310,450 B1
(45) Date of Patent: Oct. 30, 2001

(54) DRIVE SYSTEM OF A BRUSHLESS MOTOR EQUIPPED WITH HALL SENSORS SELF-DISCRIMINATING THE ACTUAL PHASING OF THE INSTALLED SENSORS

(75) Inventor: Domenico Arrigo, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/557,885

(22) Filed: Apr. 21, 2000

(30) Foreign Application Priority Data

Apr. 23, 1999 (EP) .................................. 99830243

(51) Int. Cl.$^7$ .................................................. H02K 23/00
(52) U.S. Cl. ........................ 318/254; 318/138; 318/139; 318/439; 318/715; 318/716; 318/718; 318/719; 318/720; 318/721
(58) Field of Search .................................. 318/138, 139, 318/254, 439, 715–721

(56) References Cited

U.S. PATENT DOCUMENTS

| | | | | |
|---|---|---|---|---|
| 3,678,358 | * | 7/1972 | Kolatorowicz | 318/254 |
| 4,496,893 | * | 1/1985 | Nakano et al. | 318/721 |
| 4,763,049 | * | 8/1988 | Magee | 318/254 |
| 5,001,405 | * | 3/1991 | Cassat | 318/254 |
| 5,198,733 | * | 3/1993 | Wright | 318/254 |
| 5,204,605 | * | 4/1993 | Delattre et al. | 318/721 |
| 5,367,234 | * | 11/1994 | Di'Tucci | 318/254 |
| 5,764,020 | * | 6/1998 | Maiocchi | 318/705 |
| 5,767,643 | * | 6/1998 | Pham et al. | 318/439 |
| 5,804,936 | * | 8/1998 | Brodsky et al. | 318/254 |
| 5,821,707 | * | 10/1998 | Kim | 318/254 |
| 5,841,252 | * | 11/1998 | Dunfield | 318/254 |
| 5,847,521 | * | 12/1998 | Morikawa et al. | 318/254 |
| 5,847,524 | * | 12/1998 | Erdman et al. | 318/439 |
| 5,905,348 | * | 5/1999 | Nolan | 318/254 |
| 5,910,716 | * | 6/1999 | Olsen et al. | 318/254 |
| 5,949,204 | * | 9/1999 | Huggett et al. | 318/254 |
| 5,986,419 | * | 11/1999 | Archer et al. | 318/254 |

FOREIGN PATENT DOCUMENTS

| | | | | |
|---|---|---|---|---|
| 4141000 | | 6/1992 | (DE) | G01B/21/02 |
| 2305033-A | * | 3/1997 | (DE) | H02P/6/16 |
| 1061641-A1 | * | 12/2000 | (EP) | H02P/7/01 |
| 2305033 | | 8/1995 | (GB) | H02P/6/16 |

OTHER PUBLICATIONS

Motorola Analog IC Device entitled "Brushless DC Motor Controller", No. MC33033, (1996), pp. 1–24.

* cited by examiner

Primary Examiner—Robert E. Nappi
Assistant Examiner—Tyrone Smith
(74) Attorney, Agent, or Firm—Lisa K. Jorgenson; Allen, Dyer, Doppelt, Milbrath & Gilchrist, P.A.

(57) ABSTRACT

A method is for decoding three logic signals produced by three Hall effect sensors installed in an electronically-switched three-phase brushless motor according to a sequence of six driving phases to be switched synchronously with a rotor position. The method includes determining a real phasing of the three Hall effect sensors at 60, 120, 300 or 240 electrical degrees. The determining is accomplished by decoding a whole set of eight possible combinations of the three logic signals produced by the three Hall effect sensors. The real phasing of the three Hall effect sensors is discriminated based upon two dissimilar combinations from among six valid combinations, the six valid combinations from among the eight possible combinations. The method further includes determining the rotor position based upon the real phasing of the three Hall effect sensors and generating logic driving signals synchronous with the rotor position.

24 Claims, 4 Drawing Sheets

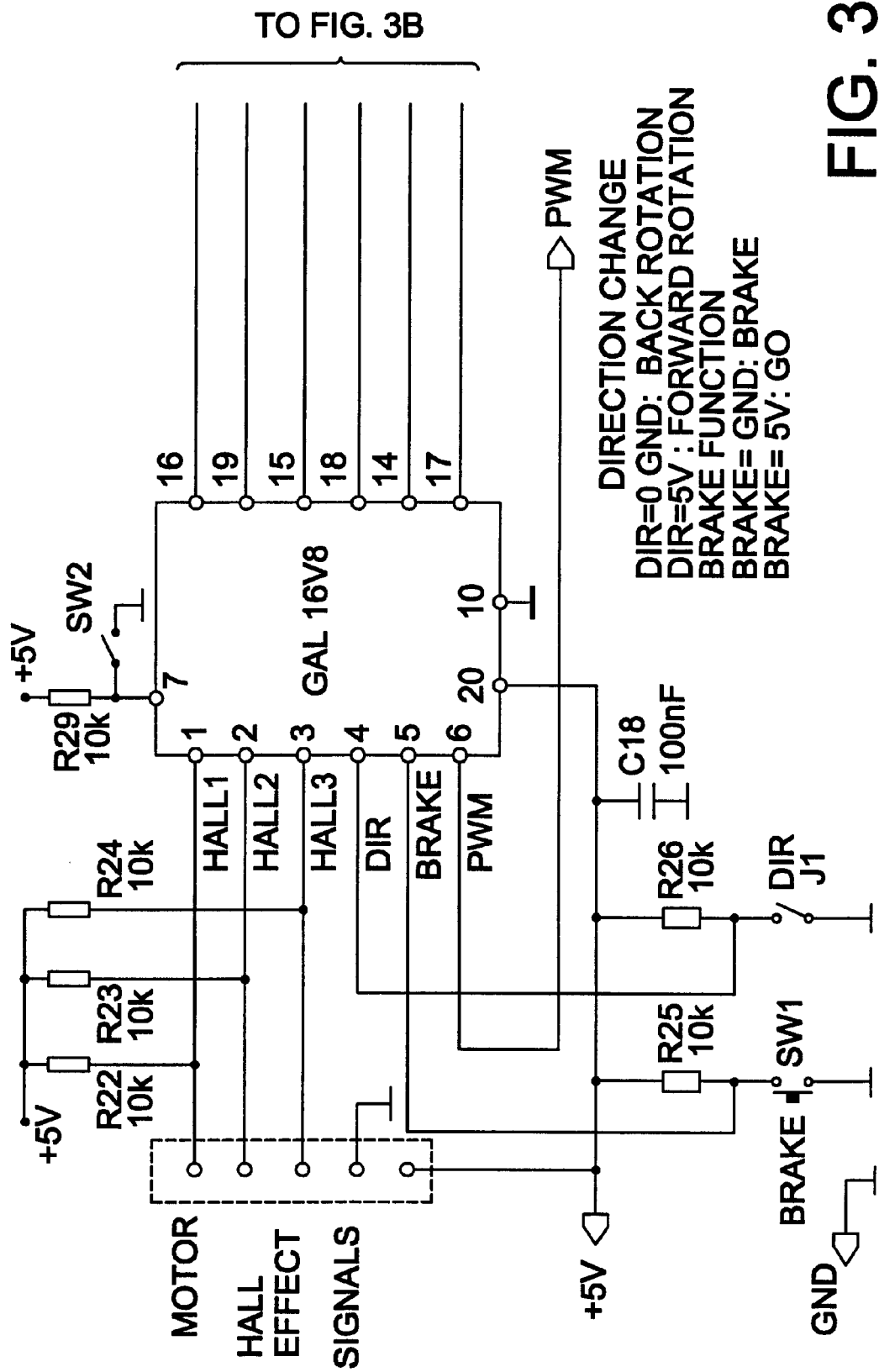

DRIVE SYSTEM OF A BRUSHLESS MOTOR EQUIPPED WITH HALL SENSORS SELF-DISCRIMINATING THE ACTUAL PHASING OF THE INSTALLED SENSORS

FIELD OF THE INVENTION

The present invention relates to field of electric motors, and, more particularly, to a drive system for an electronically switched multi-phase motor and associated methods.

BACKGROUND OF THE INVENTION

The techniques for driving electronically switched multi-phase brushless motors commonly include forcing currents through the phase windings of the motor according to a voltage or current mode control and using Hall effect sensors for synchronizing the switchings. Depending on the number of phases, windings, and poles of the rotor, the driving system must command the phase switchings according to a proper sequential scheme. This scheme must be closely synchronized with the rotor's position to maximize efficiency and minimize ripple.

Frequently, in a three-phase motor with a rotor having two pairs of poles, the switching sequence has six phases, each phase being 60 electrical degrees. One of the techniques used for determining the rotor's instantaneous position is that of installing three Hall effect sensors. These sensors are commercially available and provide for three logic signals (codes) whose logic combination permits establishing the rotor's position and the correct phase to be excited.

In general, the decoding conventions of the logic signals produced by such sensors consider different schemes. These schemes depend upon the electrical sensors' phasing in terms of electrical degrees of separation, which in turn depends on the sensors' physical positions and the number of poles on the rotor. Therefore, by changing the sensors' physical positions and the number of rotor poles, there will be different sensor phasing, for example, of 60, 120, 240 and 300 electrical degrees.

Normally, the integrated devices installed in brushless motors for decoding signals produced by the Hall effect sensors and for processing the rotor's angular position (which are commonly used to realize the electronic driving systems) contemplate the possibility of pre-establishing which sensor phasing scheme must be selected for correctly decoding and processing the sensor signals. In practice, known devices dedicate one or more pins for presetting the decoding and processing circuit. Through these selection pins (or circuit nodes), an integrated circuit can be configured to decode signals originating from Hall effect sensors positioned at intervals of 120 electrical degrees, 60 electrical degrees, or even 240 or 300 electrical degrees.

An example of a commercially available decoding device is the MC33033 by Motorola. In this device, the selection of the actual angular separation between sensors of 60 or 120 electrical degrees is made through the pins 3 and 18.

There is a need for a method and corresponding decoding circuit for decoding the logic signals produced by three Hall effect sensors relating to the instantaneous position of a rotor of a three-phase brushless motor. Such a decoding method and detection circuit should be capable of self recognizing, depending on the direction of rotation, the actual sensor positions, at intervals of either 60, 120, 300 or 240 electrical degrees, without the need for supplying such phasing information to the decoding circuit. Such a decoding method and circuit will permit the use of common devices without dedicating pins to allow for pre-setting phasing information, thus simplifying the manufacture of control systems for one or more brushless motors.

SUMMARY OF THE INVENTION

It is an object of the present invention to provide for an improved decoding method for decoding the logic signals produced by three Hall effect sensors installed in a three-phase brushless motor. It is a further object of the invention to detect the instantaneous position of the rotor of such motor and to discriminate the actual sensors' positions at intervals of 60, 120, 240 and 300 electrical degrees to correctly decode the signals and identify the phase.

The invention is based on the fact that the signals provided by the three sensors produce a total of eight possible combinations. Six of these combinations are valid, for example, for a positioning at intervals of 60 electrical degrees, while another six are valid for a positioning at intervals of 120 electrical degrees; however, in both cases only two of the six combinations are specific to a 60 or 120 degree positioning, whereas four of the six combinations are identical in both cases. The sample is valid for the other two possible phasings of the sensors, i.e., 240 and 300 electrical degrees.

By decoding a full set of eight possible combinations of the signals originating from the three sensors, it is possible to recognize, from the two dissimilar combinations of the six combinations detected in an electrical turn, the effective phasing (i.e., the separation intervals in electrical degrees) of the three sensors. Therefore, the decoder may resolve the motor's position within a window of 60 electrical degrees for phasing of the sensors at 60, 120, 240 or 300 electrical degrees, without first supplying this phasing information to the decoding circuitry.

One prior art decoding circuit is pre-conditioned to decode the six combinations relative to a phasing of the sensors at intervals of either 60 electrical degrees or 120 electrical degrees. In contrast, the present invention decodes all eight possible input combinations and recognizes from the two dissimilar combinations which phasing (i.e., angular separation) is actually implemented. As such, the system processes the input combinations and determines the position of the rotor or the current phase of the running motor to permit the generation of the correct driving signals.

BRIEF DESCRIPTION OF THE DRAWINGS

The various aspects and advantages of the invention will become even clearer through the following description of several embodiments and by referring to the attached drawings, wherein.

DETAILED DESCRIPTION OF THE PREFERRED EMBODIMENTS

Figure 1:
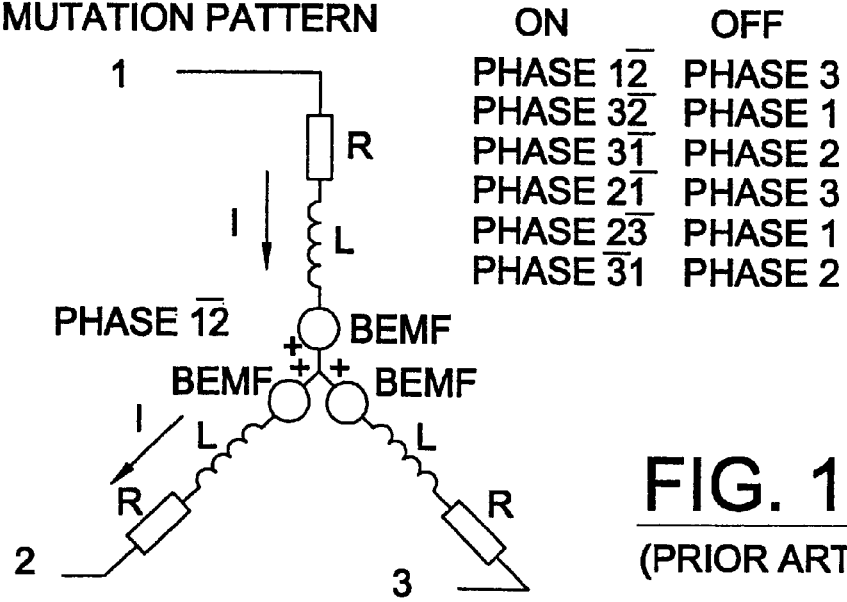
FIG. 1 shows the switching sequence of a three-phase brushless motor in a star configuration as in the prior art.

By referring to FIG. 1, containing the electrical scheme of a three-phase brushless motor in a star configuration, the six different switching phases are indicated using the notation 1 $\overline{2}$, meaning that the current flows from the terminal of the phase winding 1 to the star center and from the star center out of the terminal of phase winding 2, and so forth. However, those skilled in the art will appreciate that the method of the invention is equally applicable in the case of a motor in a triangle delta configuration.

According to the known decoding methods and relative decoders, the decoding is pre-ordered, depending on the type of phasing of all the sensors installed in the motor, for the six drive phases according to the following decoding tables.

TABLE 1

FORWARD SEQUENCE LOGIC DECODING FOR A POSITIONING AT INTERVALS OF 60 ELECTRICAL DEGREES OF THE THREE SENSORS

| H1 | 1 | 1 | 1 | 0 | 0 | 0 |
|---|---|---|---|---|---|---|
| H2 | 0 | 1 | 1 | 1 | 0 | 0 |
| H3 | 0 | 0 | 1 | 1 | 1 | 0 |
| Phase | $1\bar{3}$ | $2\bar{3}$ | $2\bar{1}$ | $3\bar{1}$ | $3\bar{2}$ | $1\bar{2}$ |

TABLE 2

FORWARD SEQUENCE LOGIC DECODING FOR A POSITIONING AT INTERVALS OF 120 ELECTRICAL DEGREES OF THE THREE SENSORS

| H1 | 1 | 1 | 0 | 0 | 0 | 1 |
|---|---|---|---|---|---|---|
| H2 | 0 | 1 | 1 | 1 | 0 | 0 |
| H3 | 0 | 0 | 0 | 1 | 1 | 1 |
| Phase | $1\bar{3}$ | $2\bar{3}$ | $2\bar{1}$ | $3\bar{1}$ | $3\bar{2}$ | $1\bar{2}$ |

For the two phasings at 60 or 120 electrical degrees, four out of the six combinations are identical. This means that the decoding logic for the four common combinations may be the same in both cases. The only difference between the two different sensor phasings is that two of the six combinations (or codes), i.e., those relative to the operating phases $2\bar{1}$ and $1\bar{2}$, are distinct. Table 3 below indicates the respective codes for these two phases of operation of the motor.

TABLE 3

| | 60 elect. deg. | | | 120 electr deg. | | |
|---|---|---|---|---|---|---|
| | H1 | H2 | H3 | H1 | H2 | H3 |
| $2\bar{1}$ | 1 | 1 | 1 | 0 | 1 | 0 |
| $1\bar{2}$ | 0 | 0 | 0 | 1 | 0 | 1 |

Therefore, all of the eight possible combinations or codes determined by the three logic signals originating from the respective Hall effect sensors may be validly decoded for the case of a sensor phasing of 120 or 60 electrical degrees. Accordingly, a decoder capable of processing all eight possible combinations or codes may resolve the rotor's position within a 60 electrical degree window (for sensor phasings of 60 or 120 electrical degrees) without requiring any selection command.

The following Table 4 shows the logic decoding of all eight combinations of the signals generated by the three sensors H1, H2 and H3, according to the method of the present invention.

TABLE 4

FORWARD SEQUENCE LOGIC DECODING FOR A PHASING OF THE THREE SENSORS OF 60 OR 120 ELECTRICAL DEGREES

| H1 | 1 | 1 | 0 | 0 | 0 | 1 | 1 | 0 |
|---|---|---|---|---|---|---|---|---|
| H2 | 0 | 1 | 1 | 1 | 0 | 0 | 1 | 0 |
| H3 | 0 | 0 | 0 | 1 | 1 | 1 | 1 | 0 |
| Phase | $1\bar{3}$ | $2\bar{3}$ | $2\bar{1}$ | $3\bar{1}$ | $3\bar{2}$ | $1\bar{2}$ | $2\bar{1}$ | $1\bar{2}$ |
| Hall sensors Phasing | 60/120 | 60/120 | 120 | 60/120 | 60/120 | 120 | 60 | 60 |

Figure 2:
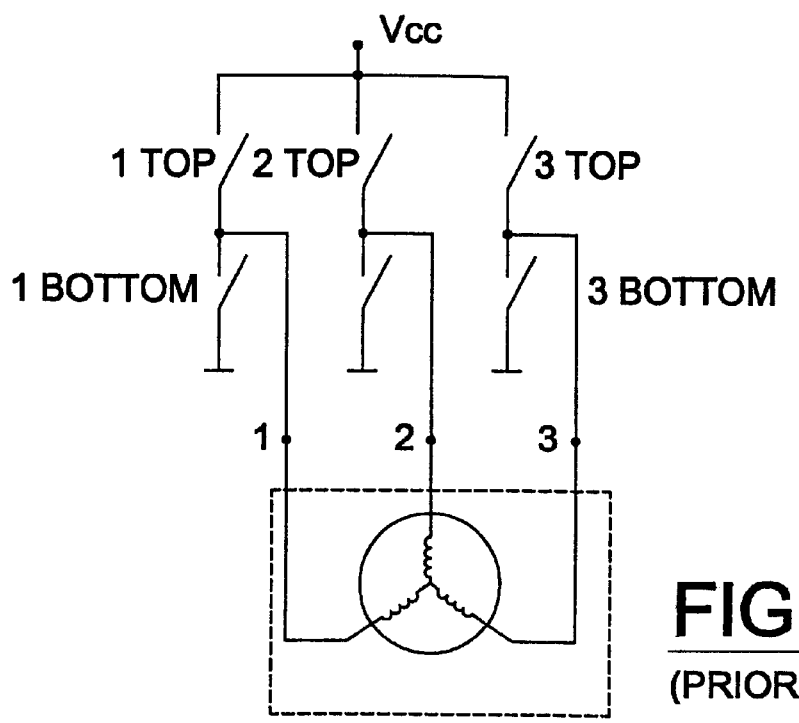
FIG. 2 is a diagram of a motor and driving three half-bridge power stage as in the prior art.

A driving circuit having an output power stage including six power switches electrically connected to make three half-bridge output driving stages for the respective phase windings of a three-phase motor is shown in FIG. 2. Each output driving half-bridge stage includes a high side switch and a low side switch. The logic decoding table defining the six driving phases of the six switches for Hall effect sensor phasings of 120 and 60 electrical degrees is shown in the Table 5 below. Logic state 1 implies a turn-on condition and logic state 0 represents a cut-off condition of a respective switch of each half-bridge.

TABLE 5

FORWARD SEQUENCE LOGIC DECODING FOR MOTORS EQUIPPED WITH HALL SENSORS WITH A PHASING OF 120 AND 60 ELECTRICAL DEGREES

| H1 | 1 | 1 | 0 | 0 | 0 | 1 | 1 | 0 |
|---|---|---|---|---|---|---|---|---|
| H2 | 0 | 1 | 1 | 1 | 0 | 0 | 1 | 0 |
| H3 | 0 | 0 | 0 | 1 | 1 | 1 | 1 | 0 |
| Phasing | $1\bar{3}$ | $2\bar{3}$ | $2\bar{1}$ | $3\bar{1}$ | $3\bar{2}$ | $1\bar{2}$ | $2\bar{1}$ | $1\bar{2}$ |
| Hall | 60/120 | 60/120 | 120 | 60/120 | 60/120 | 120 | 60 | 60 |
| 1 top | 1 | 0 | 0 | 0 | 0 | 1 | 0 | 1 |
| 2 top | 0 | 1 | 1 | 0 | 0 | 0 | 1 | 0 |
| 3 top | 0 | 0 | 0 | 1 | 1 | 0 | 0 | 0 |
| 1 Bottom | 0 | 0 | 1 | 1 | 0 | 0 | 1 | 0 |
| 2 Bottom | 0 | 0 | 0 | 0 | 1 | 1 | 0 | 1 |
| 3 Bottom | 1 | 1 | 0 | 0 | 0 | 0 | 0 | 0 |

The reduced logic functions that correspond to Table 5 are:

1top=$\overline{H2}$*(H1+$\overline{H3}$)

2top=H2*(H1+$\overline{H3}$)

3top=$\overline{H1}$+H3

1bottom=H2*($\overline{H1}$+H3)

2bottom=$\overline{H2}$*($\overline{H1}$+H3)

3bottom=H1*$\overline{H3}$

Wherein:

– Indicates the logic NOT

\* Indicates the logic AND

+ Indicates the logic OR

TABLE 6

LOGIC DECODING OF MOTORS EQUIPPED WITH HALL SENSORS WITH PHASINGS OF 120, 60, 300 and 240 ELECTRICAL DEGREES FOR BOTH FORWARD AND REVERSE ROTATION

| H1 | H2 | H3 | DIR | OUTPUT | FORWARD ROTATION With the following Hall sensor | REVERSE ROTATION With the following Hall sensor | 1 top | 2 top | 3 top | 1 bottom | 2 bottom | 3 bottom |
|---|---|---|---|---|---|---|---|---|---|---|---|---|
| 1 | 0 | 0 | 1 | $1\overline{3}$ | 60/120 | 300/240 | 1 | 0 | 0 | 0 | 0 | 1 |
| 1 | 1 | 0 | 1 | $2\overline{3}$ | 60/120 | 300/240 | 0 | 1 | 0 | 0 | 0 | 1 |
| 0 | 1 | 0 | 1 | $2\overline{1}$ | 120 | 240 | 0 | 1 | 0 | 1 | 0 | 0 |
| 0 | 1 | 1 | 1 | $3\overline{1}$ | 60/120 | 300/240 | 0 | 0 | 1 | 1 | 0 | 0 |
| 0 | 0 | 1 | 1 | $3\overline{2}$ | 60/120 | 300/240 | 0 | 0 | 1 | 0 | 1 | 0 |
| 1 | 0 | 1 | 1 | $1\overline{2}$ | 120 | 240 | 1 | 0 | 0 | 0 | 1 | 0 |
| 1 | 1 | 1 | 1 | $2\overline{1}$ | 60 | 300 | 0 | 1 | 0 | 1 | 0 | 0 |
| 0 | 0 | 0 | 1 | $1\overline{2}$ | 60 | 300 | 1 | 0 | 0 | 0 | 1 | 0 |
| 1 | 0 | 0 | 0 | $3\overline{1}$ | 300/240 | 60/120 | 0 | 0 | 1 | 1 | 0 | 0 |
| 1 | 1 | 0 | 0 | $3\overline{2}$ | 300/240 | 60/120 | 0 | 0 | 1 | 0 | 1 | 0 |
| 0 | 1 | 0 | 0 | $1\overline{2}$ | 240 | 120 | 1 | 0 | 0 | 0 | 1 | 0 |
| 0 | 1 | 1 | 0 | $1\overline{3}$ | 300/240 | 60/120 | 1 | 0 | 0 | 0 | 0 | 1 |
| 0 | 0 | 1 | 0 | $2\overline{3}$ | 300/240 | 60/120 | 0 | 1 | 0 | 0 | 0 | 1 |
| 1 | 0 | 1 | 0 | $2\overline{1}$ | 240 | 120 | 0 | 1 | 0 | 1 | 0 | 0 |
| 1 | 1 | 1 | 0 | $1\overline{2}$ | 300 | 60 | 1 | 0 | 0 | 0 | 1 | 0 |
| 0 | 0 | 0 | 0 | $2\overline{1}$ | 300 | 60 | 0 | 1 | 0 | 1 | 0 | 0 |

It will be appreciated from Table 6 that the decoding logic permits the selection of the direction of rotation of the motor (forward or reverse) and is capable of decoding the signals produced by the Hall-effect sensors for any phasing (for example, 60, 120, 240 and 300 electrical degrees).

The first three columns (H1, H2, H3) show the signals produced by the three Hall sensors. The fourth column represents the input signal (DIR) that sets the direction of rotation of the motor. The fifth column (OUTPUT) shows the excitation of the respective phase windings derived from the decoding the Hall sensor signals.

The sixth and seventh columns represent the rotation direction of the motor (forward or reverse) congruent with the respective phasing of the sensor. For example, with a signal DIR=1, the first six signal combinations of the signals from the Hall effect sensors are decoded to drive in a forward direction a motor equipped with Hall sensors with a phasing of 60 or 120 electrical degrees. With the same input DIR=1, these six combinations would be decoded to drive the motor in a reverse direction with Hall sensors with a phasing of 300 or 240 electrical degrees.

In other words, the decoding of the signals of Hall effect sensors positioned at 60 and 120 electrical degrees with a forward rotating motor corresponds to the decoding of the signals of Hall effect sensors positioned at 300 and 240 electrical degrees, respectively, with a reverse rotating motor. Conversely, the decoding of the signals of Hall effect sensors with a phasing of 60 and 120 electrical degrees with a reverse rotating motor corresponds to the decoding of the signals of Hall effect sensors with a phasing of 300 and 240 electrical degrees, respectively, with a forward rotating motor rotation.

In the case of sensors with a phasing of 60 or 120 electrical degrees, the system is capable of properly driving the motor in the correct direction of rotation by recognizing the desired rotating direction (forward if DIR=1 or reverse is DIR=0) without supplying to the system any information about the type of installed sensors (i.e., their phasing). In the case of sensors with a phasing of 300 or 240 electrical degrees, the system is capable of properly driving the motor in the correct direction of rotation by recognizing the desired rotating direction (forward if DIR=0 or reverse is DIR=1) without supplying the system with any information about the type of installed sensors (i.e., their phasing). Accordingly, in order to correctly set the desired direction of rotation it is only necessary to know if the Hall sensors have a phasing of 60 or 120 electrical degrees, or of 300 or 240 electrical degrees.

The remaining columns of Table 6 represent the output logic functions of the decoded signals.

Often, integrated driving systems, such as the L6234 device of STMicroelectronics, include a logic input driving stage and power switches. These integrated circuits have two distinct logic inputs (commands) for each half-bridge, namely INPUT and ENABLE, whose logic functions are described in the following table.

| ENABLE | 0 | 0 | 1 | 1 |
|---|---|---|---|---|
| INPUT | 0 | 1 | 0 | 1 |
| TOP Switch | 0 | 0 | 0 | 1 |
| BOTTOM Switch | 0 | 0 | 1 | 0 |

If the driving system uses such an integrated circuit, the logic decoding and driving table according the present invention will be:

TABLE 7

LOGIC DECODING OF A MOTOR EQUIPPED WITH HALL EFFECT
SENSORS WITH A PHASING OF 120 AND 60 ELECTRICAL DEGREES
AND WITH A PHASING OF 300 AND 240 ELECTRICAL DEGREES
FOR FORWARD AND REVERSE ROTATION

| H1 | H2 | H3 | DIR | OUTPUT | FORWARD ROTATION With the following Hall sensor | REVERSE ROTATION With the following Hall sensor | IN1 | IN2 | IN3 | EN1 | EN2 | EN3 |
|---|---|---|---|---|---|---|---|---|---|---|---|---|
| 1 | 0 | 0 | 1 | $1\bar{3}$ | 60/120 | 300/240 | 1 | X | 0 | 1 | 0 | 1 |
| 1 | 1 | 0 | 1 | $2\bar{3}$ | 60/120 | 300/240 | X | 1 | 0 | 0 | 1 | 1 |
| 0 | 1 | 0 | 1 | $2\bar{1}$ | 120 | 240 | 0 | 1 | X | 1 | 1 | 0 |
| 0 | 1 | 1 | 1 | $3\bar{1}$ | 60/120 | 300/240 | 0 | X | 1 | 1 | 0 | 1 |
| 0 | 0 | 1 | 1 | $3\bar{2}$ | 60/120 | 300/240 | X | 0 | 1 | 0 | 1 | 1 |
| 1 | 0 | 1 | 1 | $1\bar{2}$ | 120 | 240 | 1 | 0 | X | 1 | 1 | 0 |
| 1 | 1 | 1 | 1 | $2\bar{1}$ | 60 | 300 | 0 | 1 | X | 1 | 1 | 0 |
| 0 | 0 | 0 | 1 | $1\bar{2}$ | 60 | 300 | 1 | 0 | X | 1 | 1 | 0 |
| 1 | 0 | 0 | 0 | $3\bar{1}$ | 300/240 | 60/120 | 0 | X | 1 | 1 | 0 | 1 |
| 1 | 1 | 0 | 0 | $3\bar{2}$ | 300/240 | 60/120 | X | 0 | 1 | 0 | 1 | 1 |
| 0 | 1 | 0 | 0 | $1\bar{2}$ | 240 | 120 | 1 | 0 | X | 1 | 1 | 0 |
| 0 | 1 | 1 | 0 | $1\bar{3}$ | 300/240 | 60/120 | 1 | X | 0 | 1 | 0 | 1 |
| 0 | 0 | 1 | 0 | $2\bar{3}$ | 300/240 | 60/120 | X | 1 | 0 | 0 | 1 | 1 |
| 1 | 0 | 1 | 0 | $2\bar{1}$ | 240 | 120 | 0 | 1 | X | 1 | 1 | 0 |
| 1 | 1 | 1 | 0 | $1\bar{2}$ | 300 | 60 | 1 | 0 | X | 1 | 1 | 0 |
| 0 | 0 | 0 | 0 | $2\bar{1}$ | 300 | 60 | 0 | 1 | X | 1 | 1 | 0 |

X indicates a "don't care" condition. That is, it is not necessary to consider any specific value to be assigned.

The reduced logic functions that corresponds to the table are:

IN1=($\bar{H2}$*DIR)+(H2*$\bar{DIR}$)

IN2=(H2*DIR)+($\bar{H2}$*$\bar{DIR}$)

IN3=(H3*DIR)+($\bar{H3}$*$\bar{DIR}$)

EN1=($\bar{H1}$+$\bar{H2}$+H3)*(H1+H2+$\bar{H3}$)

EN2=($\bar{H1}$+H2+H3)*(H1+$\bar{H2}$+$\bar{H3}$)

EN3=($\bar{H1}$*H3+H1*$\bar{H3}$)

Wherein:

– indicates the logic NOT

* indicates the logic AND

+ indicates the logic OR

Figure 3B:
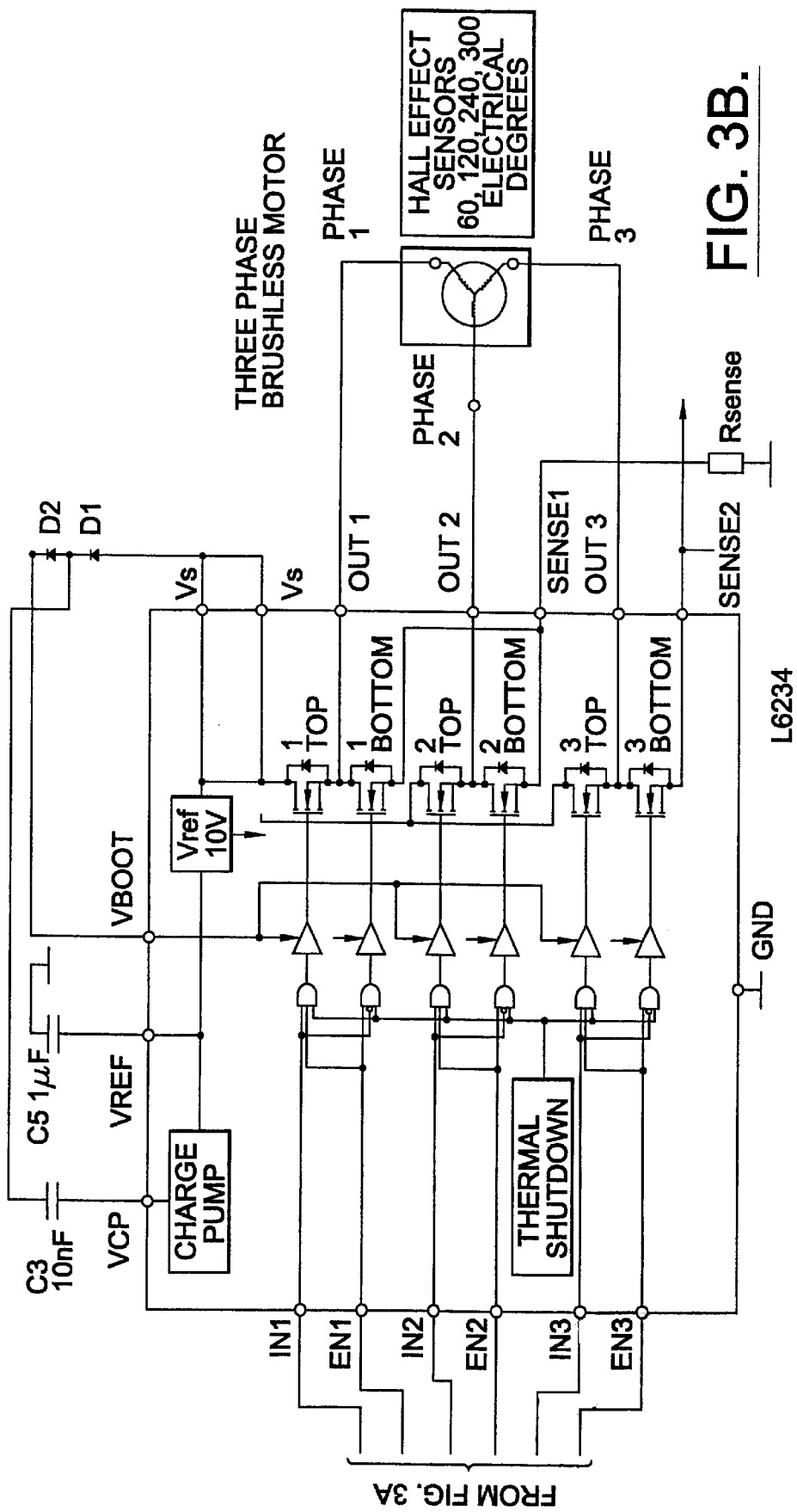
FIG. 3 is a circuit diagram of an embodiment of the driving system of the invention.

The system according to the invention with a scheme as depicted in FIG. 3 has been tested using a programmable logic device, namely a GAL16V8. The correct logic driving sequence is produced by the GAL16V8 by decoding the signals coming from three Hall effect sensors installed in the motor and generating INPUT and ENABLE signals as shown in the diagrams of FIG. 4.

An electrical braking function is obtained by conditioning the input signals (IN) to a low logic level in order to turn on the low side diffused metal oxide semiconductor (DMOS) transistor of the half-bridges, which is enabled by the corresponding enable signal (EN). The pulse width modulation (PWM) signal is used to effect the "chopping" of the INPUT signals. With the DIR jumper open, a forward rotation is obtained if the installed Hall effect sensors have a phasing of 60 or 120 electrical degrees, or a reverse rotation is obtained if the Hall effect sensors have a phasing of 300 or 240 electrical degrees. The converse is true when the DIR jumper is applied to ground. The switch SW2 commands the starting and the stopping of the motor.

Figure 4:
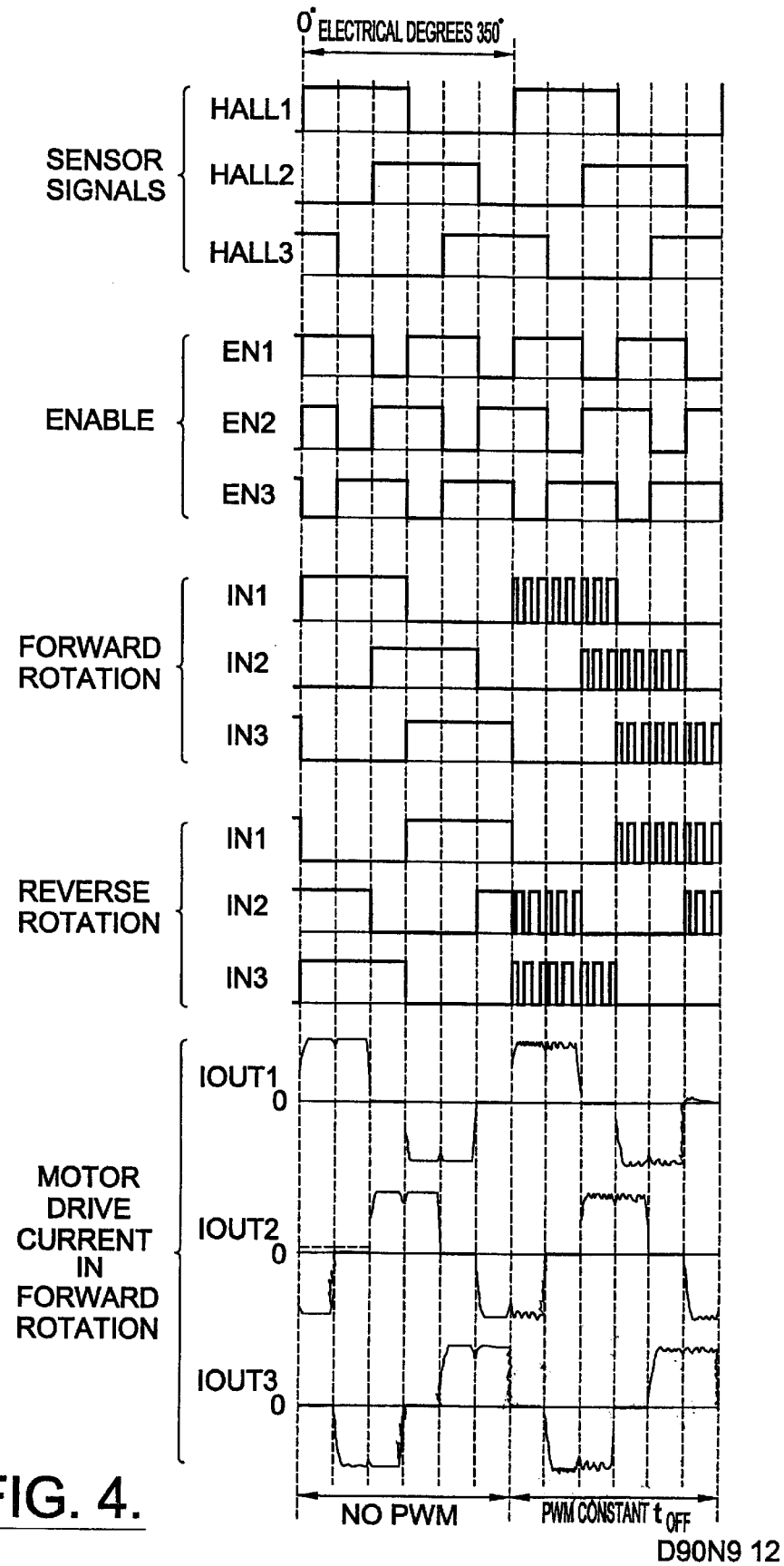
FIG. 4 shows the driving diagrams for the driving system of FIG. 3.

The representative signals of the driving scheme of FIG. 3 are depicted in the diagrams of FIG. 4.

That which is claimed:

1. A method of decoding three logic signals produced by three Hall effect sensors installed in an electronically-switched three-phase brushless motor according to a sequence of six driving phases to be switched synchronously with a rotor position, the method comprising:

determining a real phasing of the three Hall effect sensors at 60, 120, 300 or 240 electrical degrees by
decoding a whole set of eight possible combinations of the three logic signals produced by the three Hall effect sensors, and
discriminating the real phasing of the three Hall effect sensors based upon two dissimilar combinations from among six valid combinations, the six valid combinations from among the eight possible combinations; and determining the rotor position based upon the real phasing of the three Hall effect sensors and generating logic driving signals synchronous with the rotor position.

2. The method of claim 1 wherein four of the six valid combinations are coincident.

3. The method of claim 1 further comprising providing a rotation direction selection signal.

4. A method of decoding three position signals produced by three rotor position sensors installed in an electronically-switched three-phase brushless motor according to a sequence of six driving phases to be switched synchronously with a rotor position, the method comprising:

determining a real phasing of the three rotor position sensors at predetermined phasings of electrical degrees by decoding a whole set of combinations of the three position signals produced by the three rotor position sensors, and discriminating the real phasing of the three rotor position sensors based upon two dissimilar combinations; and determining the rotor position based upon the real phasing of the three rotor position sensors and generating driving signals synchronous with the rotor position.

5. The method of claim 4 wherein each of the three rotor position sensors comprises a Hall effect sensor.

6. The method of claim 4 wherein the whole set of combinations of the three position signals produced by the three rotor position sensors comprises eight combinations.

7. The method of claim 6 wherein six of the combinations are valid; and wherein the two dissimilar combinations are from among the six valid combinations.

8. The method of claim 7 wherein four of the six valid combinations are coincident.

9. The method of claim 4 wherein the predetermined phasings of electrical degrees comprise 60, 120, 240 or 300 electrical degrees.

10. The method of claim 4 further comprising providing a rotation direction selection signal.

11. A driving system for an electronically-switched three-phase brushless motor comprising three Hall effect sensors producing respective logic signals and three motor windings according to a sequence of six driving phases switched synchronously with the rotor's position, the driving system comprising:

a decoding logic circuit receiving the logic signals and a selection signal indicating a desired direction of rotation and outputting three pairs of logic driving signals for driving the three windings of the motor, said decoding logic circuit determining a real phasing of the three Hall effect sensors at 60, 120, 300 or 240 electrical degrees by decoding a whole set of eight possible combinations of the three logic signals produced by the three Hall effect sensors, and discriminating the real phasing of the three Hall effect sensors based upon two dissimilar combinations from among six valid combinations, the six valid combinations from among the eight possible combinations.

12. The driving system of claim 11 wherein the decoding logic circuit determines the rotor position based upon the real phasing of the three Hall effect sensors.

13. The driving system of claim 11 wherein the logic driving signals are synchronous with the rotor position.

14. The driving system of claim 11 wherein four of the six valid combinations are coincident.

15. A device for decoding three position signals produced by three rotor position sensors installed in an electronically-switched three-phase brushless motor according to a sequence of six driving phases to be switched synchronously with a rotor position, the device comprising:

a rotor position determining circuit for determining the rotor position and comprising a real phasing determining circuit for determining a real phasing of the three rotor position sensors at predetermined phasings of electrical degrees by decoding a whole set of combinations of the three position signals produced by the three rotor position sensors, and discriminating the real phasing of the three rotor position sensors based upon two dissimilar combinations; and a driving circuit connected to said rotor position determining circuit for generating driving signals synchronous with the rotor position.

16. The device of claim 15 wherein each of the three rotor position sensors comprises a Hall effect sensor.

17. The device of claim 15 wherein the whole set of combinations of the three position signals produced by the three rotor position sensors comprises eight combinations.

18. The device of claim 17 wherein six of the combinations are valid; and wherein the two dissimilar combinations are from among the six valid combinations.

19. The device of claim 18 wherein four of the six valid combinations are coincident.

20. The device of claim 15 wherein the predetermined phasings of electrical degrees comprise 60, 120, 240 or 300 electrical degrees.

21. The device of claim 15 wherein said rotor position determining circuit has an input for a rotation direction selection signal.

22. A circuit for self-recognizing the real phase of three rotor position sensors installed in an electronically-switched three-phase brushless motor according to a sequence of six driving phases to be switched synchronously with a rotor position, the circuit comprising:

a rotor position determining circuit having no inputs for pre-selecting a phasing of the rotor position sensors, said rotor position determining circuit determining a real phasing of the rotor position sensors at 60, 120, 300 or 240 electrical degrees by decoding a whole set of eight possible combinations of the three logic signals produced by the three Hall effect sensors, and discriminating the real phasing of the three Hall effect sensors based upon two dissimilar combinations from among six valid combinations, the six valid combinations from among the eight possible combinations.

23. The circuit of claim 22 wherein each of the three rotor position sensors comprises a Hall effect sensor.

24. The circuit of claim 22 wherein four of the six valid combinations are coincident.

* * * * *